United States Patent [19]

Louis et al.

[11] 4,087,843
[45] May 2, 1978

[54] POSITIONING DEVICE FOR THE ACCESS ARM OF THE MAGNETIC HEAD OF A MAGNETIC DISK STORAGE

[75] Inventors: Helmut P. Louis, Sindelfingen; Arno Matla, Waldenbuch; Karl Heinz Schaller, Herrenberg; Volker Zimmerman, Schoenaich, all of Germany

[73] Assignee: International Business Machines Corporation, Armonk, N.Y.

[21] Appl. No.: 722,183

[22] Filed: Sep. 10, 1976

[30] Foreign Application Priority Data

Dec. 23, 1975 Germany ..........................2558359

[51] Int. Cl.² ...................... G11B 21/08; G11B 21/10; G11B 5/56
[52] U.S. Cl. ...................................... 360/78; 318/653; 360/77; 360/97; 360/135
[58] Field of Search .................. 360/78, 77, 75, 86, 360/97–99, 135; 318/615–618, 638, 653

[56] References Cited

U.S. PATENT DOCUMENTS

| | | | |
|---|---|---|---|
| 3,034,111 | 5/1962 | Hoagland et al. | 360/77 |
| 3,534,344 | 10/1970 | Santana | 360/78 |
| 3,812,533 | 5/1974 | Kimura et al. | 360/77 |
| 3,924,268 | 12/1975 | McIntosh et al. | 360/77 |
| 3,994,016 | 11/1976 | Moghadam | 360/77 |
| 4,027,338 | 5/1977 | Kril | 360/77 |

*Primary Examiner*—Alfred H. Eddleman
*Attorney, Agent, or Firm*—Herbert F. Somermeyer

[57] ABSTRACT

The surface of a magnetic disk (23) is divided into servo sectors ($S_1$) and data sectors ($S_2$). A selectively positionable magnetic head (24) effects, in predetermined time intervals controlled by clock signals of a clock sensor (26), the transfer of servo and data signals. The servo signals sensed in the servo sectors are used for the track following control of the magnetic head.

The servo markings (Ma) recorded in the servo sectors ($S_1$) are arranged, with twice the width ($2d$) of the data tracks in radial distances of one respective track width ($d$), one beside the other in a row along a disk radius. In each servo sector at least three rows (A, B, C) of servo markings (Ma) are provided. The servo markings are arranged in track direction one behind the other in such a manner that between each of the rows (A, B, C) a distance ($g$) is formed, and that each servo marking of one row overlaps a servo marking of the following row by one track width ($d$).

18 Claims, 9 Drawing Figures

POSITIONING DEVICE FOR THE ACCESS ARM OF THE MAGNETIC HEAD OF A MAGNETIC DISK STORAGE

BACKGROUND OF THE INVENTION

The invention relates to a positioning device for the access arm of the magnetic head of a magnetic disk storage, which is positionable onto selective track addresses of the magnetic disk, with control of the magnetic head position for the track following by means of servo markings which are arranged at the magnetic disk in servo sectors of the recording tracks, staggered relative to each other in track direction and covering twice the width of a recording track, and with a switching device which is synchronized with the disk rotation, and which upon the sensing of the servo sectors by the magnetic head applies the sensed servo signals in predetermined intervals to a servo circuit.

It is known (GE-OS 2,404,309; U.K. Patent Specification No. 1,396,834) to design a positioning device for the access arm of the magnetic head of a magnetic disk storage in such a manner that the access arm, upon positioning of the magnetic head to a track address, is driven by a motor the speed of which is controlled during the positioning movement of the magnetic head by a servo device. This device effects an initial speed, a following uniform speed, and a delay of the access arm at the end of the positioning path before the magnetic head reaches the track address. The speed control of the access arm is effected by a servo circuit which upon reaching of the track address by the magnetic head, is switched off by the driving motor of the access arm. At the same time, the motor of the access arm is switched into a servo control circuit which initiates the guiding of the magnetic head over the center of a recording track.

In the above known device, servo and data markings are associated to different disk surfaces of a magnetic disk storage. The servo markings of a disk surface are sensed by a magnetic servo head, and the data markings of a disk surface are sensed by a magnetic data head. Both magnetic heads are associated jointly to an access arm which by means of an access motor positions the magnetic heads to a selected track addresses. When the track address has been reached, the servo control for the track following the magnetic heads is switched in which after a few oscillations are guided through the track following of the servo control over the center of the recoding tracks.

It is known, (GE-OS 2,202,747; U.S. Pat. No. 3,691,543) to form the magnetizing pattern of a servo track out of two adjacent track areas which in parallel spots, show positive-going transitions of the magnetic flux. In the intervals between these positive-going transitions of the magnetic flux each track area contains a negative-going transition of the magnetic flux which to the negative-going transitions of the magnetic flux of the adjacent tracks is arranged in staggered distance in track direction. From the positive-going transition of the magnetic flux the clock signals are derived, and the negative-going transitions of the magnetic flux arranged in spaced formation supply the servo signals for the track centering of the magnetic heads. The device contains an automatic amplifier control by means of which upon the sensing of the servo signals a correction of the signal amplitudes is achieved when the magnetic servo head reaches differing flight heights in different track areas of the magnetic disk. The amplification control consists in that the signal amplitudes are added up by two negative-going transitions of the magnetic flux. With the same flight height of the magnetic head the sum of the two signals is constant, independently of the deviation from the track center. A changing of the sum signal is determined by comparing it with a reference signal. The difference of the sum signal from the reference signal is evaluated for the amplification control which considers the changing of the flight height of the magnetic head. The servo circuit can thus compensate signal errors originating from the changing of the flight height of the magnetic servo head.

Although by means of the known device it is possible to obtain an automatic amplification control for considering the flight height of the magnetic servo head, it is necessary to generate in each clock period of the system at least two servo signals having different phase shifts. This results in a high transition frequency and a great band width of the magnetizing pattern, with the consequence of a low signal-to-noise ratio in the generation of the servo signals.

It is also known (GE-AS 1,424,516; U.S. Pat. No. 3,185,972) to control the track following of a magnetic head by means of servo signals which are sensed at servo markings that are recorded in servo sectors of the recording tracks. The servo sectors are arranged in the same angular distances between the data sectors of the magnetic disk. The sensing of the data and servo sectors of a magnetic disk is performed by one single magnetic head carrier which is positioned to the track address of a recording track. For that purpose, the servo circuit is controlled by a switching device synchronized with the disk rotation, and which upon sensing of the servo sectors by means of the magnetic head applies the sensed servo signals in predetermined intervals to the servo circuit. At the magnetic head carrier a servo magnetic head and a data magnetic head are arranged in parallel in a spacing of three recording tracks. Each address position of the magnetic head carrier has associated thereto two concentric recording tracks of the magnetic disk storage whose data sectors are sensable on the one hand by the magnetic servo head and on the other by the data magnetic head. The return of the magnetic servo head to the center of the servo track is still possible when it has been deflected by the 0.75-fold of an address spacing from the track center to the left or the right, respectively. The control range of the known device thus comprises a total of the 1.5-fold of the track spacing between two track addresses that are arranged concentrically one beside the other.

The disadvantage of the known device consists in that the density of the addressable recording tracks of a magnetic disk storage is limited. In the known device, there is furthermore the disadvantage than an automatic amplification control of amplitude controls of the servo signals caused by changes of the flight height of the magnetic servo head can be achieved only by a more implicate device.

SUMMARY

It is the object of the present invention to design a positioning device for the access arm of the magnetic head of a magnetic disk storage in such a manner that by an access movement of the magnetic head a positioned track address can be selected with great reliability, and maintained with great precision by the track follower control.

This object is achieved in accordance with the present invention in that the servo markings of magnetic disk marking areas following each other in track direction are provided one beside the other in spacings of one respective width of a recording track in radial direction of the magnetic disk, and that servo markings arranged one behind the other in track direction in amounts of arc lengths with angular spacings are provided one following the other and staggered by one respective width of a recording track, and that at least three servo markings arranged one following the other in track direction over the center of marking lines are associated to successive track addresses.

By the above arrangement of a servo marking pattern in the servo sectors of the magnetic disks of a magnetic disk storage, it is possible to reach, upon an access movement of the magnetic head toward a selected track address, a greater radial control area on both sides of the address track. Furthermore, the magnetizing pattern permits an improvement of the control precision which is required for the track following of a magnetic head on the address track.

The invention will be explained in detail by means of figures.

The foregoing and other objects, features, and advantages of the invention will be apparent from the following more particular description of preferred embodiments of the invention, as illustrated in the accompanying drawings.

DETAILED DESCRIPTION

Figure 1:
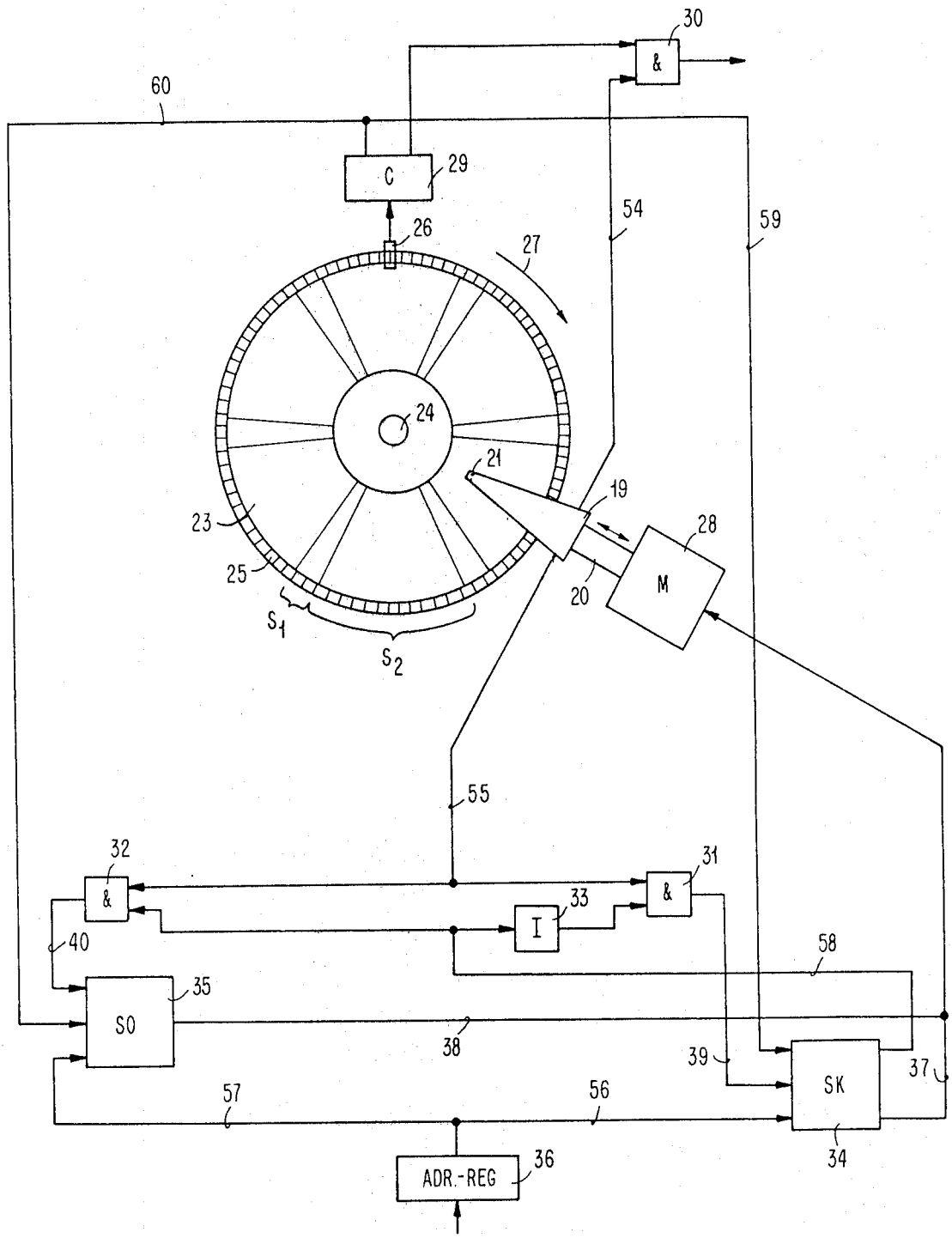
FIG. 1 — the overall arrangement of the positioning device for the access arm of the magnetic head of a magnetic disk storage.

The surface of magnetic disk 23 of FIG. 1 is divided into servo sectors $S_1$ and data sectors $S_2$. Magnetic disk 23 is connected to driving spindle 24 so that by a driving motor (not shown) it can be rotated in the direction of arrow 27. Recording tracks concentrically provided on the surface of magnetic disk 23 are sensed by magnetic head 21 which is supported at the tip of magnetic head carrier 19. By means of positioning movements of access arm 20 which by access motor 28 is selectively positionable in radial direction of the magnetic disk magnetic head 21 can be positioned to a selected recording track on the surface of the magnetic disk. After the positioning of magnetic head 21 to a selected track addressing sensing of a concentric recording track is performed which according to the representation, is divided in servo sectors $S_1$ and in data sectors $S_2$ which are respectively arranged in the same angular distances and whose track lengths are dimensioned by respective equal amounts of arc length of the servo sectors and the data sectors. A marking track 25 synchronized with the rotation of the magnetic disk, which track can be recorded in the outer track of the magnetic disk, is sensed by a sensor 26 and applied to a counter 29. The clock signals sensed at marking track 25 can be used for controlling the signals transferred by the magnetic head 21, in such a manner that depending on the rotation angle of the magnetic disk servo signals associated to servo sectors $S_1$, are transferred to line 55, and data signals associated to data sectors $S_2$ are transferred to line 54.

By means of a servo device (U.K. Patent Specification No. 1,396,834) (not shown in detail), magnetic head 21, according to a predetermined track address, is approached to a recording track by means of a movement of access arm 20. In the approaching zone of the recording track, magnetic head 21 senses the servo markings in servo sectors $S_1$, and applied for the precise detection of the track address to "track seeking circuit" 34 via line 55, AND circuit 31 of input line 39. Furthermore, clock signals from the output of counter 29 are applied thereto via line 56 and via line 59. The transfer of the "seek-servo signals" from magnetic head 21 via AND circuit 31 to "track seek circuit" 34 is carried out by means of an output signal of the "track seek circuit" which, via line 58 and inverter 33, is transferred to an input of AND circuit 31. This signal transferred via line 58 indicates that at the end of its access movement magnetic head 21 has not yet found the track address so that, via output line 37 of "track seek circuit" 34, a seek signal is transferred to access motor 28 which effects radial positioning of magnetic head 21 until "track seek circuit" 34 detects the marking pattern associated to the track address and sensed at the servo sector, and a respective detection signal is derived at line 58 of the "track seek circuit" 34. This detection signal interrupts the transfer of servo signals by AND circuit 31 and effects an input signal at AND circuit 32, so that by the latter, servo signals transferred by line 55 are applied as "track following servo signals" to an input line 40 of "track following circuit" 35. The "track following circuit" receives via input line 57 from address register 36 a signal for the track address, and via line 60 an output signal of counter 29 which, by means of clock signals, determines switch times of the servo markings sensed at servo sectors $S_1$ of the magnetic disk. "Track following circuit" 35 detects track deviations of magnetic head 21 from the center of a track address, so that line 35 transfers "track following servo signals" to access motor 28 which, through radial driving movements, effects changes of position of magnetic head 21 for its positioning on the center of the recording track.

Figure 2:
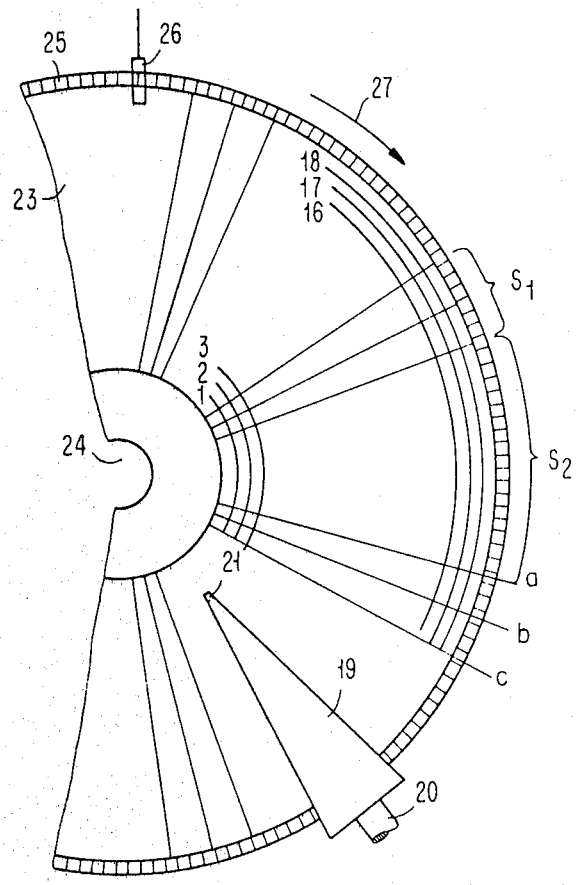
FIG. 2 — an enlarged sectional view of the magnetic disk of a magnetic disk storage with arrangement of the servo and data sectors.

FIG. 2 shown an enlarged representation of magnetic disk 23 with the elements which have already been explained in connection with FIG. 1. To the surface of the magnetic disk the concentric recording tracks with the track address 1, 2, 3, . . . 16, 17, 18 are associated. These recording tracks are subdivided into the already mentioned servo sectors $S_1$ and data sectors $S_2$. Radial lines a, b, c, designate the center lines of marking areas of servo sectors $S_1$ where in radial direction, one behind the other, magnetic servo markings are recorded.

Figure 3:
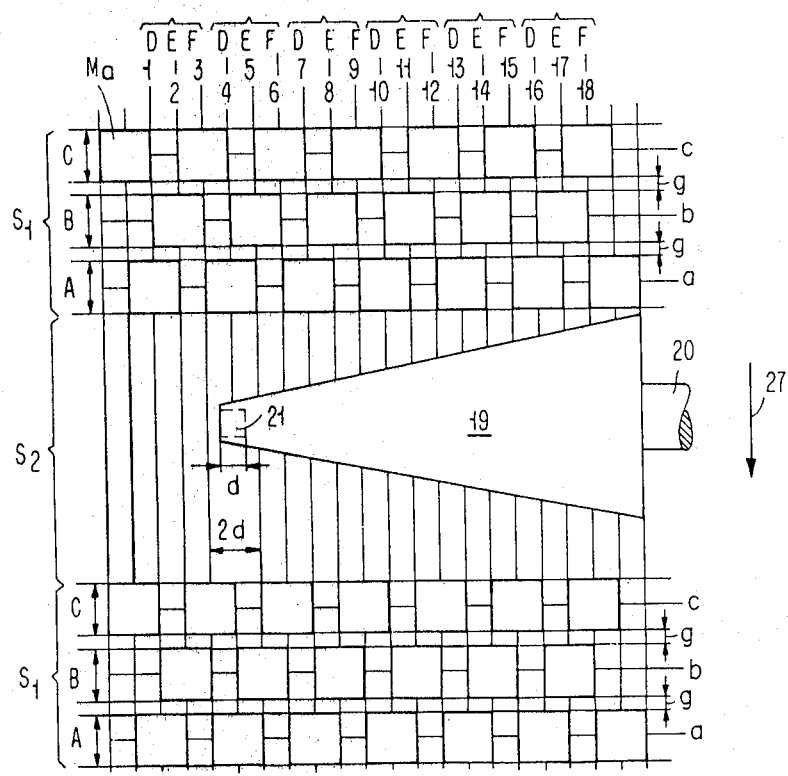
FIG. 3 — the development of servo and data sectors of concentric recording tracks of a magnetic disk, as shown in FIG. 2.

FIG. 3 gives a representation of the linear development of the recording tracks, as shown in FIG. 2, of track addresses 1 to 18 with the section of a data sector $S_2$ which on both sides is limited by servo sectors $S_1$. Magnetic head 21 is guided over the recording track of track address "4" which shows track width "d". In servo sectors $S_1$ magnetic servo markings "Ma" are recorded along radial lines a, b, c, which markings show the track width "2d". Servo markings "Ma" are arranged in angular distances "g" in track direction one behind the other in such a manner that their marking center is determined by radial lines a, b, and c. On these radial lines, markings "Ma" are arranged one beside the other in distances of one respective width "d" of a marking track. Magnetic servo markings "Ma" of marking areas A, B, and C succeeding each other in track direction are arranged in radial direction staggered against each other in such a manner that two servo markings succeeding each other in track direction are staggered by one respective width of a recording track. Three respective servo markings arranged one behind the other are associated to marking lines D, E, F where the servo markings characterize three different track types. Magnetic markings "Ma" of the servo magnetizing pattern of a servo sector $S_1$ characterize, along a marking line "D", track addresses 1, 4, 7, 10, 13, 16. The servo markings of marking lines "E" characterize track address 2, 5, 8, 11, 14, 17. The servo markings of marking lines "F" characterize track addresses 3, 6, 9, 12, 15, 18. In this manner, successive track addresses are each associated to different marking groups corresponding to the marking lines D, E, F. Thus, upon the sensing of the servo magnetizing pattern along marking lines D, E, F, different signal sequences are generated which identify adjacent track addresses. These signal sequences are obtained through signals of different amplitude which follow each other with respect to time and which are generated when magnetic head 21 showing the same track width "d" as recording tracks 1 to 18 of the magnetic disk senses servo markings "Ma" in corresponding time sections $T_A$, $T_B$, and $T_C$ derived from clock track 25. The clock control of these time sections could also be derived from the servo magnetizing pattern of servo sectors $S_1$ when the recording-free distances "g" existing in the direction of the recording tracks between the servo markings MA are sensed and used for the clock control. The magnetizing of a servo marking "Ma" can, within a marking area, be formed either by non-erasable or by erasable direct current or alternating current magnetization. Servo markings "Ma" and track width "d" of magnetic head 21 are dimensioned in radial direction of the magnetic disk in such a manner that in each radial position of the magnetic head in at least one of the time sections $T_A$, $T_B$, or $T_C$, a servo marking is sensed in the entire width "d" of the magnetic head track. Thus, at least a servo signal of full amplitude value is obtained, upon each crossing of a servo sector $S_1$ by magnetic head 21. This signal can form a "reference signal" for an automatic amplification control of the sensing amplifier which compensates variations of the sensing signals caused by variations of the flight height of the magnetic head. An automatic amplification control which is used for a reference signal is obtained from the specification of known devices (U.S. Pat. No. 3,691,543). In the track position of magnetic head 21 on track address "4", as shown in FIG. 3, the servo magnetizing pattern of servo sector $S_1$ is sensed in such a manner that the marking "Ma" generates a servo signal of maximum amplitude which, in amplitude areas B and C is followed by respective servo signals of half the maximum amplitude.

The difference of the two servo signal amplitudes of the two marking areas B and C presents the value zero which indicates that magnetic head 21 is guided on track center. Upon deviations from the track center the sensing of the marking zones B and C results in differing amplitudes, the difference of which indicates the lateral shifting of magnetic head 21 from the track center. The amplitude of the servo signals, however, depends on the flight height of the magnetic head so that upon a sensing process prior to the forming of the difference of the signal amplitudes, these are compared with the reference signal which had been sensed in marking area A. Upon a deviation of magnetic head 21 from the center of track address "4", the following servo signals are obtained for a track following, for a servo control by the "track following circuit" 35 of FIG. 1:

$B_o = K(1+x)$ $C_o = K(1-x)$ $A_o = 2K$

Lateral shifting $x$ is then obtained from the following equation:

$X = (B_o - C_o/A_o)$

In this equation, the position-determining servo signals $B_o$ and $C_o$ are divided in each difference generation by servo signal $A_o$ determining the reference value. A circuit arrangement for evaluating this equation can be carried out in a known manner by a counting integration circuit which checks how often (as a fraction) the signal value of servo signal $A_o$ is contained in the difference of the servo signals $B_o - C_o$.

The servo magnetizing pattern of servo sectors $S_1$, as shown in FIG. 3, effects a track selection when magnetic head 21 is brought into the selection area of a track address, and it effects a track guiding in the center of the track address when magnetic head 21 has reached the track address. For this purpose, and by the sensing of the servo magnetizing patterns of servo sectors $S_1$, servo signals $S_k$ and $S_o$, respectively, are sensed which are evaluated by the "track selection circuit" of FIG. 1, or the "track following circuit", respectively, upon the approach of magnetic head 21 to a track address, first for a control of the track selection and upon reaching of the track address for a control of the track following.

Figures 4, 5, 6:
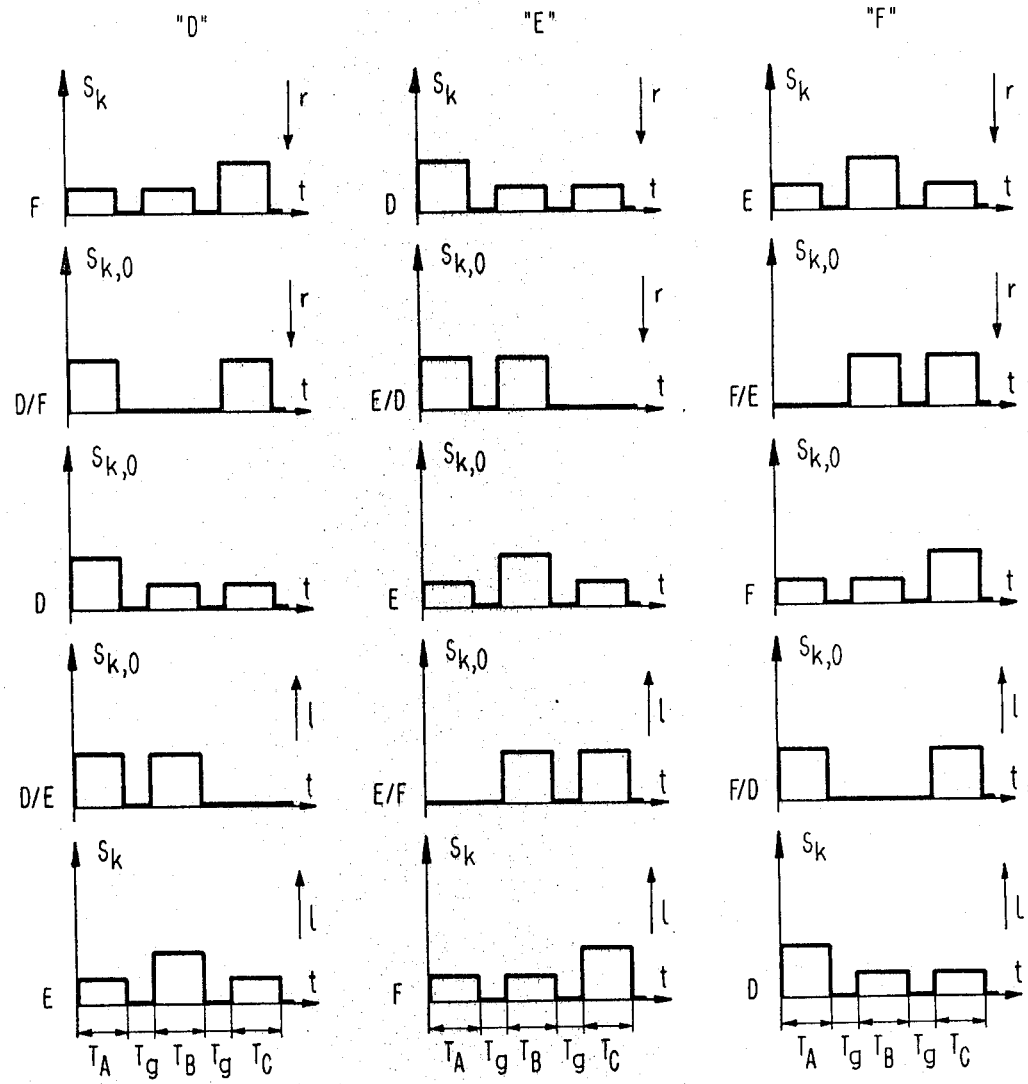
FIGS. 4–6 — signals curves generated upon the sensing of the servo markings shown in FIG. 3.

FIGS. 4 to 6 show the signal sequences generated upon the sensing of the servo magnetizing patterns, as a function of whether magnetic head 21 follows a marking line "D", a marking line "E", or a marking line "F". When magnetic head 21 follows a track line in the middle between two marking lines, this is indicated in the signal diagrams by a double marking, e.g. D/F, D/E.

The positioning device for the access arm of magnetic head 21 can be controlled through the control of the track selection 34 of FIG. 1 in such a manner that according to the representation of FIG. 4 track addresses of marking lines "D" are still reached by the magnetic head when the latter is in the position of marking line "F" or of marking line "E". The diagrams of the servo signal sequences show that upon a deviation to the right of the magnetic head from the marking line "D", i.e., upon a track following of marking line "E" or of the inter-area central line "D/E" the maximum values of servo signal amplitudes $S_k$ are obtained in clock time $T_B$. Similarly, upon a deviation to the left of the magnetic head from marking line "D", upon a track following of marking line "F", or of inter-area central line "D/F", the maximum servo signal amplitudes $S_k$ are obtained in clock times $T_C$. This encoding of the signal sequences permits, upon a deviation to the left of the magnetic head from marking line "D", a return of the magnetic head in arrow direction "$r$" to the right, and upon a deviation to the right of the magnetic head from marking line "D" a return of the magnetic head in arrow direction "$l$" to the left.

FIG. 5 shows that upon the association of the magnetic head to a track address with the marking line "E", servo signal amplitudes $S_k$ required for the return of the magnetic head are obtained in arrow direction "$l$" to the left, in respective clock times $T_C$. Similarly, upon a deviation of the magnetic head from marking line "E" to the left, the servo signal amplitudes $S_k$ required for the return of the magnetic head to the right are obtained in arrow direction "$r$" to the right, in clock times $T_A$.

According to the representation of FIG. 6, encodings of servo signal sequences $S_k$ are obtained for the control of the track selection of a track address with marking line "F". The maximum amplitudes of servo signals $S_k$ required for the return of the magnetic head occur in case of deviations to the left of the magnetic head at clock times $T_B$, and with deviations to the right of the magnetic head at clock times $T_A$.

The different amplitude values of the signal sequences are encoded, as a function of time, in such a manner that predetermined correlations between amplitude values of servo signals $S_k$ and clock times $T_A$, $T_B$, and $T_C$ form characterizations for the track selection.

By means of FIG. 7, the operation of the "track selection circuit" 34 of FIG. 1 will be explained in detail. The servo signals sensed by magnetic head 21 are applied to input line 39 of the "track selection circuit". These servo signals are applied to one respective input of AND circuits 61, 62, and 63. To one respective second input of these AND circuits, a control signal depending on the track addressing is applied. In this manner, AND circuit 63 receives a control signal when magnetic head 21 is to be positioned, by the positioning device of the access arm, to one of track addresses 1, 4, 7, . . . which correspond to the track type of marking lines "D". Similarly, the second inputs of AND circuits 62 or 61 receive control signals when magnetic head 21 is to be positioned to track addresses with marking lines of the track types "E" or "F". The output of AND circuit 63 is connected to one respective input of one of AND circuits 64 and 65. The second inputs of these AND circuits receive clock signals derived from counter C, so that AND circuit 64 during clock time $T_A$ of FIG. 4, and AND circuit 65 during clock time $T_C$ is prepared for actuation. If AND circuit 64 is actuated at clock time $T_B$ by a servo signal of maximum amplitude, this means that magnetic head 21 is in the deviation to the right from marking line "D" in the area between marking lines D and E. The AND circuit 64 output signal applied to the input of amplitude detector 70 is transferred to the input marked "$l$" of mixer 73 whose output controls via line 37 access motor 28 for a "movement to the left" of magnetic head 21. If during clock time $T_C$ a servo signal of maximum amplitude is transferred to the input of amplitude detector 71, this means in accordance with FIG. 4, that magnetic head 21 is in deviation to the left from marking line "D" in the area between marking lines $d$ and $f$. The servo signal transferred at the output of amplitude detector 71 via the line having the reference "$r$" to the second input of mixer 73 causes via line 37 and access motor 28 a deviation of magnetic head 21 to the left. The diagram of FIG. 4 shows that in case of a track type of marking line "D" which corresponds to track addresses 1,4 7 . . . no servo signals of maximum amplitude are transferred at clock times $T_B$ and $T_C$ to the inputs of amplitude detectors 70 and 71 when magnetic head 21 is over the center of the track address which corresponds to marking line "D". This signal state which is determined by means of comparator circuit 72 effects at the latter's output line 58 a signal which in accordance with FIG. 1, interrupts the transfer of servo signals to the $S_k$ "track selection circuit" 34, and prepares the transfer of servo signals $S_o$ to "track follower circuit" 32.

When the magnetic head is positioned to a track address 2, 5, 8 . . . which corresponds to a track type with the marking line "E", servo signals of maximum amplitudes are obtained at clock times $T_A$ and $T_C$ which by AND circuits 62 and 66, 67 are transferred to the inputs of amplitude detectors 70 and 71. As already explained above, servo signals $S_k$ are thus obtained at the inputs with the markings "$l$" or "$r$" of mixer 73, which effect deviations to the left or right of magnetic head 21, by means of access motor 28 until the transfer of the servo signals is switched from "track selection circuit" 34 to "track follower circuit" 35.

Figure 7:
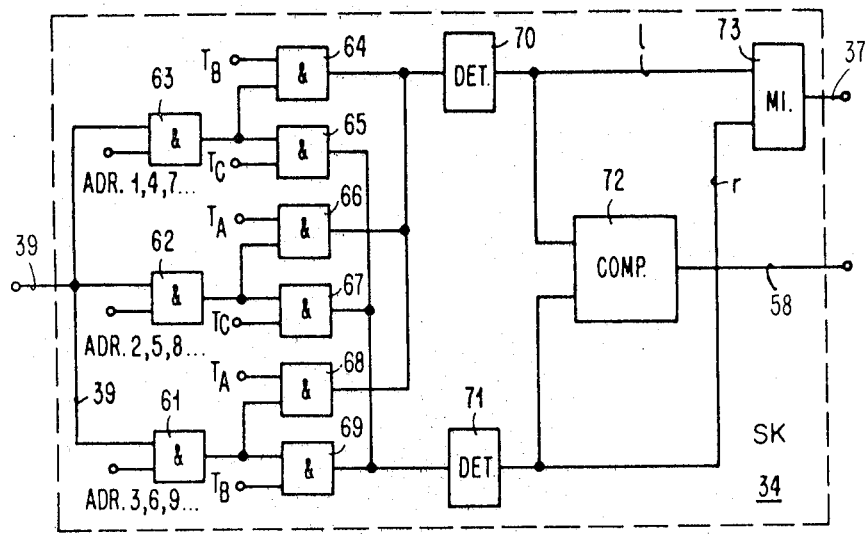
FIG. 7 — a circuit arrangement for evaluating the servo signals sensed from the servo sectors of a magnetic disk for the track selection of the magnetic head.

A positioning of magnetic head 21 to a track address 3, 6, 9 which corresponds to a track type with marking line "F" generates according to FIG. 6 in clock times $T_A$ and $T_B$ servo signals $S_k$ of maximum amplitude which according to the representation of FIG. 7, are transferred by AND cicuits 61 and 68, 69 as servo signals either for a left-hand or right-hand deviation of magnetic head 21 to output line 37 of mixer 63, until the positioning device of the magnetic head is switched for the track follower control.

Figure 8:
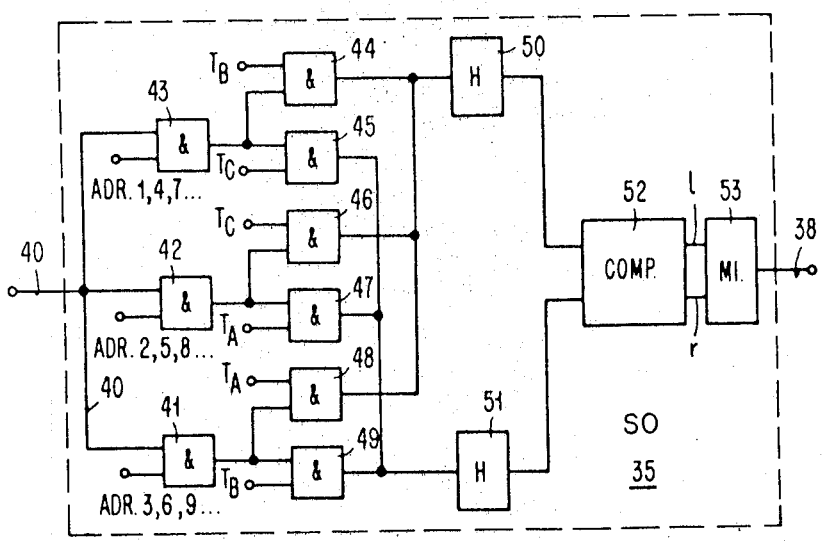
FIG. 8 — a circuit arrangement for the evaluation of the servo signals sensed from the servo sectors of a magnetic disk for the track following control of the magnetic head.

The operation of the track following control of magnetic head 21 is explained in detail by means of FIG. 8. It shows the individual switching elements of "track following circuit" 35 of FIG. 1. Servo signals $S_o$ sensed by magnetic head 21 are applied via line 40 to one respective input of AND circuits 41, 42, and 43. To the second inputs of these AND circuits control signals are applied, depending on whether magnetic head 21 is guided to a track address 1, 4, 7 . . . of the track type with marking line "D", a track address 2, 5, 8 . . . of the track type with the marking line "E", or a track address 3, 6, 9 . . . with the marking line "F".

In the case of a track following control of magnetic head 21 for track addresses 1, 4, 7 . . . which correspond to a track type of marking line "D", there occur in clock times $T_B$ and $T_C$, according to FIG. 4, servo signals $S_o$ of equal amplitude when magnetic head 21 follows exactly marking line "D". At the successive clock times $T_B$ and $T_C$, the servo signals are transferred at the successive clock times $T_B$ and $T_C$ by AND circuits 43, 44, 45 to holding circuits 50 and 51 which effect a signal storing that is limited with respect to time. Signals derived at the outputs of holding circuits 50 and 51 are applied to the compare circuit 52 at whose outputs no servo signals are derived when magnetic head 21 is over the center of marking line "D" and when the corresponding signal diagram shown in FIG. 4 is sensed. When magnetic head 21 is shifted from marking line "D" to center line D/F between the two marking lines D and F, servo signals $S_o$ are generated whose amplitudes decrease in clock time $T_B$ and increase in clock time $T_C$. When line D/F is reached servo signal $S_o$ reaches in clock time $T_B$ the value zero, and in clock time $T_C$ the maximum amplitude. Similarly, upon a deviation to the right of magnetic head 21 from marking line "D" to center line D/E in the area between marking lines D and E in clock times $T_B$, servo signals of increasing amplitude are generated, and in clock times $T_C$ servo signals of lower amplitude. When magnetic head 21 has reached line D/E, servo signal $S_o$ has its maximum value at clock time $T_B$ and its zero value at clock time $T_C$.

According to the representation of FIG. 8, servo signals $S_o$ with different amplitudes are transferred at clock times $T_B$ and $T_C$ by AND circuits 44 and 45 to holding circuit 50 on the one hand, and on the other, to holding circuit 51. The output signals of the holding circuits are checked by compare circuit 52 which upon the presence of a signal amplitude of the servo signal which at the output of holding circuit 50 is higher than at the output of holding circuit 51 transfers, at the output marked "*l*", a servo signal to mixer 53. The latter effects via line 38 and via access motor 28 a left-hand deviation of magnetic head 21 until the magnetic head has reached the center of marking line "D", and signals of the same amplitude are detected at the inputs of compare circuit 52. If from holding circuit 51 to the one input of the compare circuit a servo signal is transferred whose amplitude is higher than the servo signal transferred from the other holding circuit 50 to the second input of the compare circuit, this means, according to FIG. 4, that magnetic head 21 deviates to the left from the center of marking line "D", so that during clock times $T_C$ servo signals $S_o$ are transferred by AND circuit 45 to holding circuit 51, whose amplitude is higher than the servo signals transferred during clock time $T_B$ by AND circuit 44 to holding circuit 50. Thus, servo signals are produced at the output of compare circuit 52 at the line marked "*r*" which by mixer 53 via line 38 are transferred to access motor 28 for a deviation of the magnetic head to the right.

"Track following circuit" 35 effects a track following of magnetic head 21 with an addressing for track type of marking line "D" in the area between lines D/F and D/E.

Upon a positioning of magnetic head 21 to a track address 2, 5, 8 ... of a track type with the marking line "E" there occur according to the signal diagrams of FIG. 5, servo signals $S_o$ in the track areas between lines E/D and E/F due to left-hand or right-hand deviations of the magnetic head, which return the magnetic head to the center of marking line "E". Servo signals $S_o$ of different amplitude are transferred by AND circuits 42 and 46, 47 during clock times $T_A$ and $T_C$ for the comparison at compare circuit 52. Depending on the deviation of magnetic head 21 from the center of marking line "E", there follows via the outputs marked "*l*" and "*r*" of compare circuit 52 a signal transfer to access motor 28 which effects a return of the magnetic head to the center of marking line "E".

When magnetic head 21 is positioned to a track address 3, 6, 9 ... of a track type with marking line "F" the signal amplitudes of the servo signals $S_o$ which are required for the track following control of the magnetic head are obtained from the signal diagrams according to FIG. 6. In accordance with the representation of FIG. 8, the servo signals of different amplitude value are transferred during clock times $T_A$ and $T_B$ by AND circuit 41 and AND circuits 48, 49 to compare circuit 52 which, depending on deviations to the left or to the right of the magnetic head, transfers servo signals via mixer 53 to access motor 28 for shifting the magnetic head to the right or to the left.

The output lines marked "*l*" and "*r*", in FIG. 8, of compare circuit 52 can supply access motor 28 with servo signals which depending on the deviation amount of the magnetic head from the center of a marking line increase or decrease functionally. Similarly, from the amplitude detectors 70 and 71 outputs shown in FIG. 7 and marked "*l*" and "*r*", which can be designed as threshold value stages, servo signals can be derived whose amplitudes, depending on the shifting amounts of the magnetic head from the center of marking lines "D, E, F" can functionally increase or decrease.

Figure 9:
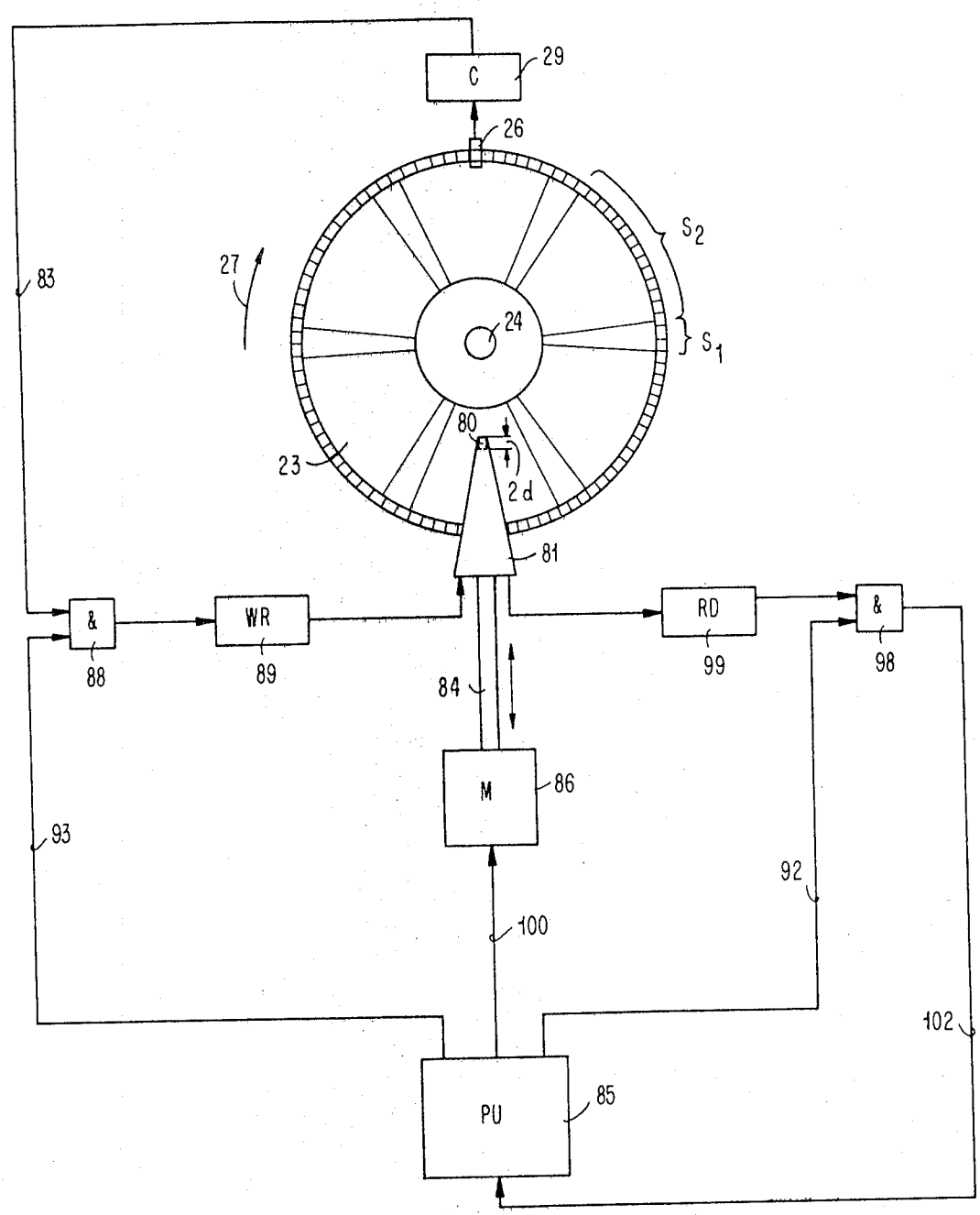
FIG. 9 — a circuit arrangement with magnetic head shifting device for recording servo markings of the servo magnetizing pattern shown in FIG. 3.

The device shown in FIG. 9 effects the recording of the servo markings Ma shown in FIG. 3. There are recorded in servo sectors $S_1$ of magnetic disk 23 by means of magnetic writing head 80 fixed on a magnetic head carrier 81. The magnetic head 80 covers a track width "2d" which has twice the width of track width "d" of the recording tracks provided for magnetic disk 23. The recording of servo markings Ma is performed through the control of clock signals which are sensed by the clock sensor 26 from a clock track 25 synchronized with the rotation of magnetic disk 23, and converted by counter 29 into control signals of recording periods $T'_A$, $T'_B$, and $T'_C$. These recording periods effect the transfer of the recording signal from magnetic head 80 to magnetic disk 23 in such a manner that servo markings Ma succeeding each other in track directon, are transferred into marking areas A, B, C.

The recording of the servo marking starts in that by control unit 85 via line 100 a control signal is transferred to access motor 86 which by access arm 84 positions magnetic head 80 fixed to magnetic head carrier 81 on the surface of magnetic disk 23 in radial direction onto the track address not specifically shown in FIG. 3, which is the outer track of magnetic disk 23. When magnetic head 80 has been positioned, process unit 85 transfers via line 93 a write signal to the one input of AND circuit 88. The second input of AND circuit 88 receives a control signal at clock time $T'_A$, so that via write amplifier 89 a recording signal is transferred to magnetic head 80. During a disk rotation there occurs, in all servo sectors $S_1$ of the magnetic disk at clock times $T'_A$, the recording of servo markings Ma which are thus transferred into the associated angle positions of the marking area A of FIG. 3 of the recording track. During a second disk rotation, an input line of AND circuit 98 receives from the control circuit via line 92 a read signal, and the write signal of line 93 is switched off. Also during the second disk rotation, control markings Ma of track address 19 which are sensed by magnetic head 80 are transferred via read amplifier 99 and via line 102 to process unit 85. The mean amplitude value of all sensed signals is stored in process unit 85. During following disk rotations, the control signal transferred from process unit 85 via line 92 to an input of AND circuit 98 is maintained. During these cycle periods of magnetic disk 23 there is a shifting, following a control signal transferred from the process unit via line 100 to access motor 86, of magnetic head 80 to the disk surface in radial direction toward the interior until the sensing signals that are sensed by magnetic head 80 during a disk rotation, and transferred to process unit 85 via line 102 and stored therein, have reached a mean amplitude value whose amount is half as high as the mean value of the sensed amplitude amounts that has been stored during the second disk rotation in process unit 85.

When it has been determined by process unit 85 that during a disk rotation only half of the amplitude amount of the mean value of the sensing signals has been stored, magnetic head 80 has reached track address 18 shown in FIG. 3.

During a following disk rotation, the read signal is interrupted at output line 92 of process unit 85, and instead a write signal is transferred via line 93 to an input of AND cicuit 88. The second input of AND circuit 88 receives during the disk rotation clock signal $T'_C$ via line 83 so that in accordance with the representation of FIG. 3 in all control sectors $S_1$ of magnetic disk 23, control markings Ma are recorded at angle positions of markings areas C.

After the recording of control markings Ma in the recording track of track address 18, the write signal derived from process unit 85 via line 93 is interrupted, and the read signal is switched in via line 92 to an input of AND circuit 98. During the following disk rotation control marking Ma recorded in the recording track of track address 18 is sensed, and the mean amplitude value of all sensing signals which is produced during the disk rotation is stored in process unit 85. During successive disk rotations, there is again an advance of magnetic head 80 at the disk surface in radial direction to the interior, with a simultaneous sensing of control marking Ma recorded in the recording track of track address 18. The signals sensed at the control markings are transferred by read amplifier 99, AND circuit 98, and line 102 to process unit 85 where the mean amplitude amount of all sensing signals of a disk rotation is compared with the mean amplitude amount of the sensing signals stored prior to the shifting of the magnetic head. If, during a disk rotation the mean amplitude amount of all sensing signals reaches the medium value of the mean amplitude amount stored prior to the magnetic head shifting in process unit 85, the shifting of magnetic head 80 is interrupted, and via output line 93 of the process unit, a write signal is transferred to an input of AND circuit 88. During a following disk rotation clock signals are transferred at clock times $T'_C$ via line 83 to the second input of AND circuit 88, so that via write amplifier 89, recording signals are transferred to magnetic head 80. At this time, the latter is on the recording track of track address 17, so that in this recording track in servo sectors $S_1$ of the magnetic disk, at all angle positions which correspond to the angle areas B of FIG. 3, servo markings Ma are recorded.

By a recording device of the above described type all servo markings Ma as shown in FIG. 3 of the servo magnetizing pattern can be recorded in the servo sectors $S_1$ of magnetic disk 23. For this purpose, there follows successively the track shifting of magnetic head 80 from the outer track of track address 19 of the magnetic disk, which outer track is not specified in detail in FIG. 3, to the interior track 0 not specified in detail. The recording of servo markings Ma takes place successively in different cycles of the magnetic disk in the marking areas in the order A, C, B to which clock time $T'_A$, $T'_C$ and $T'_B$ are associated. The correct clock sequence is controlled by counter 29 of FIG. 9, which is controllable either by process unit 85 for this clock sequence, or the clock sequence of which is following a predetermined counting program depending on the amount of disk rotations.

While the invention has been particularly shown and described with reference to preferred embodiments thereof, it will be understood by those skilled in the art that various changes in form and details may be made therein without departing from the spirit and scope of the invention.

What is claimed is:

1. Positioning device for the access arm of the magnetic head of a magnetic disk storage, which is positionable onto selective track addresses of the magnetic disks, with control of the magnetic head position for the track following by means of servo markings which are arranged at the magnetic disk in servo sectors of the recording tracks, staggered relative to each other in track direction and covering twice the width of a recording track, with a switching device which is synchronized with the disk rotation, and which, upon the sensing of the servo sectors by the magnetic head, applies the sensed servo signals in predetermined intervals to a servo circuit, characterized in that:

the servo markings of magnetic disk marking areas follow each other in track direction are provided one beside the other in spacings of one respective width of a recording track in radial direction of the magnetic disk;

servo markings arranged one behind the other in track direction in amounts of arc lengths with angular spacings are provided one following the other and staggered by one respective width of a recording track; and at least three servo markings arranged one following the other in track direction over the center of marking lines are associated to successive track addresses.

2. Positioning device as claimed in claim 1, characterized in that:

the control of the magnetic head position for the seeking of a track address is switchable by a track selection circuit; and the track following control by a track following circuit at successive intervals by servo signals sensed from the servo signal pattern of the magnetic disk.

3. Device as claimed in claim 1, characterized in that the servo markings of the marking areas show magnetizing patterns of periodically changing field intensity.

4. Device for recording servo markings in the servo sectors of a magnetic disk for a positioning device as claimed in claim 1, characterized in that:

a magnetic head having twice the track width of the recording tracks and being positionable in radial direction is supplied with recording signals in a predetermined clock sequence in various cycles of the magnetic disk; and where the radial recording positions of the magnetic head are positionable by the comparison of the mean amplitude values of the signals sensed in successive disk rotations at said servo markings.

5. The method of track seeking and following using a pattern of servo signals for grouping the tracks into bands with servo signal durations for each track within each band being in a unique combination, and a plurality of servo signals for each track disposed along a given sector length of each said track;

the improvement including the following steps in combination:

measuring amplitudes of said servo signals and determining sequence of amplitudes for indicating track position within a band; and measuring energy of each said servo signals and comparing same for indicating position error with respect to said indicated track.

6. The method set forth in claim 5 further including the steps of selecting two of said measured amplitudes supposedly having equal amplitudes and comparing energy of said two signals for indicating said position error.

7. The method of indicating position of relatively movable record and transducer members, said record member having servo signals for desired positions respectively and exhibiting a given servo energy to sequence position relationship for each said position,
the steps of:
positioning said members to approximately said desired position and serially sensing amplitudes of said servo signals,
indicating said amplitude sequence for identifying said desired position,
measuring servo energy sensed by said transducer;
comparing said measured energy with a predetermined reference energy, and
supplying a position error signal in accordance with said comparison.

8. A record member having a magnetically coating surface for receiving signals in a plurality of parallel tracks having equally spaced and parallel track location lines defined by a plurality of servo position signals spaced along the track lengths in servo sectors, each sector having a leading portion;
the improvement including in combination:
each of said sectors having a plurality of servo signal groups, each group including a plurality of servo signals disposed transversely to said track location lines;
a first of said signal groups being disposed in said leading portion having a servo signal disposed and centered on ones of said track location lines for yielding a full amplitude servo signal for said one track location lines;
a plurality less one of said signal groups being disposed so as to be sensed after said servo signals in said first group and having diverse positional relationships to said one track location lines and each of said plurality less one groups having signals only centered on predetermined ones of said track location lines; and
all signals in each said groups abutting on given track location lines.

9. A record member having a magnetically coated surface for receiving signals in a plurality of parallel record tracks having track location lines defined by a plurality of servo position signal sectors spaced along the track length;
the improvement including in combination:
each sector having a plurality of at least three of servo signal groups extending transversely to said track location lines and being circumferentially spaced along the tracks within each said sector;
each of said groups having a servo signal pattern centered on each respective given ones of said track location lines; and
said servo signals pattern in said each group extending between predetermined ones of said track location lines respectively.

10. The member set forth in claim 9 wherein each said servo signal in each said groups extending between a two most laterally adjacent track location lines of said respective given track location lines.

11. A record member having patterns for identifying track locating lines for addressing adjacent record tracks, including in combination:
a plurality of servo signals aligned transversely to length of said track locating lines, for each track locating line there being a plurality of longitudinally spaced servo signals, one of which is substantially symmetrically disposed about said each track locating line and two servo signals of which substantially abuts said each track locating lines.

12. The subject matter of claim 11 wherein said track locating lines are laterally spaced a given pitch distance apart, each said servo signal having a lateral extent of about twice said pitch distance and lateral spacings between adjacent ones of said servo signals is about said pitch distance.

13. The subject matter of claim 11 wherein each said servo signal includes a constant frequency portion.

14. The subject matter of claim 11 wherein said record member is a circular disk with said track locating lines being concentric and said directions transverse to said lines being radial; and
said plurality of servo signals occupying a limited circumferential space on each of said track locating lines with said plurality being repeated circumferentially around said member in spaced-apart relationships for enabling recording of data signals circumferentially intermediate adjacent ones of said plurality of servo signals.

15. A record member having patterns for identifying track locating lines for locating parallel record tracks, respectively, said lines being spaced a given distance; including in combination:
a plurality of groups of servo signals aligned transversely to said track locating lines and said groups being disposed longitudinally along said lines;
each servo signal having an extent transverse to said lines greater than said given distance; and
predetermined ones of said servo signals abutting one of said locating lines and other predetermined ones of said servo signals being centered on said locating lines such that each said track location line has at least one servo signal centered thereon and two of said servo signals abutting said each track.

16. A track selection and follow circuit for use with a record member having a plurality of parallel tracks, each track identifiable by a unique sequence of predetermined signal bursts;
means for reading said signal bursts and supplying servo signals derived therefrom, each having predetermined signal energy;
the improvement including in combination:
track selection means for measuring and indicating the amplitude of servo signals and sequence of said amplitudes for uniquely identifying a track;
control means responsive to said indication to supply a set of control signals in accordance with said indications; and
track compare means for comparing energy of said servo signals from successive signal bursts in each said sequence and supplying a track position error signal in accordance with said comparison for said indicated track.

17. The circuit set forth in claim 16 including other means for mutually exclusively actuating said track selection and compare means; and means in said track selection means to actuate said other means to activate said compare means.
18. The circuit set forth in claim 17 further including:
a transducer movably mounted with respect to a second member;
a head actuator connected to both said selection and compare means and in operative connection to said transducer for moving same and being responsive to said control signals and said track position error signal to move said transducer in accordance therewith.

* * * * *